(12) United States Patent
Sankaramanchi

(10) Patent No.: US 7,236,770 B2
(45) Date of Patent: Jun. 26, 2007

(54) SYSTEM AND METHOD FOR NOTIFYING TARGET COMMUNICATION DEVICES OF MESSAGE RECEPTION AT A MESSAGE SERVER VIA LOG FILE MONITORING

(75) Inventor: Sunil Sankaramanchi, Plano, TX (US)

(73) Assignee: Good Technology, Inc., Santa Clara, CA (US)

( * ) Notice: Subject to any disclaimer, the term of this patent is extended or adjusted under 35 U.S.C. 154(b) by 593 days.

(21) Appl. No.: 10/653,830

(22) Filed: Sep. 3, 2003

(65) Prior Publication Data

US 2005/0047557 A1    Mar. 3, 2005

(51) Int. Cl.
*H04M 1/663* (2006.01)

(52) U.S. Cl. ............... 455/412.2; 455/413; 455/414.2

(58) Field of Classification Search ............... 455/418, 455/419, 412.2, 413, 412.1, 414.1, 420, 414.2; 709/227, 206, 237, 246
See application file for complete search history.

(56) References Cited

U.S. PATENT DOCUMENTS

| | | | | |
|---|---|---|---|---|
| 5,647,002 | A * | 7/1997 | Brunson ..................... | 709/206 |
| 6,301,245 | B1 * | 10/2001 | Luzeski et al. ............. | 370/352 |
| 6,430,177 | B1 * | 8/2002 | Luzeski et al. ............. | 370/356 |
| 6,600,930 | B1 * | 7/2003 | Sakurai et al. ........... | 455/414.3 |
| 6,978,316 | B2 * | 12/2005 | Ghaffar et al. ............ | 709/246 |
| 7,035,382 | B1 * | 4/2006 | Shin et al. ................ | 379/88.12 |
| 7,062,538 | B2 * | 6/2006 | Horstmann et al. ........ | 709/206 |
| 2003/0028580 | A1 * | 2/2003 | Kucherawy ................ | 709/101 |
| 2004/0043770 | A1 * | 3/2004 | Amit et al. ................ | 455/450 |
| 2004/0133699 | A1 * | 7/2004 | Hashem et al. ............ | 709/237 |
| 2004/0203940 | A1 * | 10/2004 | Urs ........................... | 455/466 |
| 2004/0205248 | A1 * | 10/2004 | Little et al. ................ | 709/246 |
| 2004/0205330 | A1 * | 10/2004 | Godfrey et al. ............ | 713/150 |
| 2004/0215782 | A1 * | 10/2004 | Syed .......................... | 709/227 |
| 2004/0267963 | A1 * | 12/2004 | Whynot ...................... | 709/248 |
| 2005/0004992 | A1 * | 1/2005 | Horstmann et al. ........ | 709/206 |
| 2005/0021644 | A1 * | 1/2005 | Hancock .................... | 709/206 |
| 2005/0058260 | A1 * | 3/2005 | Lasensky et al. .......... | 379/1.03 |
| 2005/0125553 | A1 * | 6/2005 | Wu et al. ................... | 709/233 |

OTHER PUBLICATIONS

JP Mobile Comparison, see www.jpmobile.com.
JP Mobile Architecture, see www.jpmobile.com.
JP Mobile, *SureWave Enterprise Server Product White Paper*, Oct. 24, 2002.
JP Mobile, *SureWave Enterprise Server Security White paper*, Oct. 24, 2002.
JP Mobile, *SureWave Sync Server 3.0 Product White Paper*, Dec. 18, 2002.
JP Mobile, *SureWave Enterprise Server*, Jul. 2, 2003.

* cited by examiner

*Primary Examiner*—Matthew Anderson
*Assistant Examiner*—Tan Trinh
(74) *Attorney, Agent, or Firm*—Blakely Sokoloff Taylor & Zafman, LLP

(57) ABSTRACT

A communication system includes a message server which receives messages addressed to target communication devices coupled to the message server by a communication link. The message server includes a log file which tracks the time that messages intended for various addressed communication devices are received by the message server. The message server includes a log file activity detector which periodically checks the log file to determine if a message addressed to a particular communication device has been received with a predetermined past time period. If a message has been so received and logged, the mail server notifies the target communication device that the message has been delivered to the communication device's mailbox on the message server. The user of the communication device can then opt to retrieve the message.

23 Claims, 2 Drawing Sheets

SYSTEM AND METHOD FOR NOTIFYING TARGET COMMUNICATION DEVICES OF MESSAGE RECEPTION AT A MESSAGE SERVER VIA LOG FILE MONITORING

BACKGROUND

The disclosures herein relate generally to communication systems and more particularly to communication systems which transmit text and other messages to user communication devices.

Intelligent mobile devices including personal digital assistances (PDA's), smart phones and small hand-held computers are becoming more common. To enable mail and other messages to be electronically delivered to mobile devices, the mobile device is typically connected to a mail server either through a wireless link or by a fixed wired connection when the device is cradled or docked. It is useful to occasionally update the mobile device with information from the mail server. For example, as time goes by the mail server will receive mail which is addressed to a particular mobile device. The activity of updating the mobile device's stored data with messages and data intended for a particular mobile device may be referred to as synchronizing or synching the mobile device.

In one representative communication system, the system includes hundreds of mobile devices each with its own mailbox on the mail server. Every 30 seconds the system opens all of the mailboxes and sends newly arrived messages to the mobile devices. Unfortunately, this type of system does not lend itself to scaling. When you scale up to thousands of mobile devices and mailboxes, the system slows down as it tries to open all of the mailboxes to send newly arrived messages to the mobile devices. Wireless transmission speeds are currently substantially less than the speed obtainable via fixed wire line connections. Thus when a wireless message communication system is scaled up to accommodate a large number of users, the effective communication speeds as perceived by users can substantially suffer.

What is needed is a way to scale up a message communication system with less degradation in the effective speed with which messages are communicated to communication device users.

SUMMARY

Accordingly, in one embodiment, a method is disclosed for processing messages. The method includes receiving messages by a message server which includes a plurality of message boxes associated with respective user communication devices. The method further includes logging, by the message server, the messages in a log file. The method also includes checking, by the message server, the log file to detect if a message has been received by the message server for a particular user communication device within a predetermined time period thus providing message detection information.

In another embodiment, a communication system is disclosed which includes an input for receiving messages. The system also includes a plurality of message boxes for storing messages, each message box being associated with a respective user communication device. The system further includes a log file for logging times that respective messages are received for respective user communication devices. The disclosed system still further includes a log file activity detector for accessing the log file to detect if a message has been received by the communication system for a particular user communication device within a predetermined time period thus providing message detection information. The system also includes an output driven by the log file activity detector for notifying a particular user communication device with message detection information.

A principal advantage of the embodiments disclosed herein is increased speed of communication of messages to a communication device user when a system is scaled up to accommodate a large number of users.

DETAILED DESCRIPTION

The present disclosure provides a unique method and system for processing messages intended for delivery by a message server to a particular communications device. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present disclosure have been omitted inasmuch as such details are within the skills of persons of ordinary skill in the relevant art.

Figure 1:
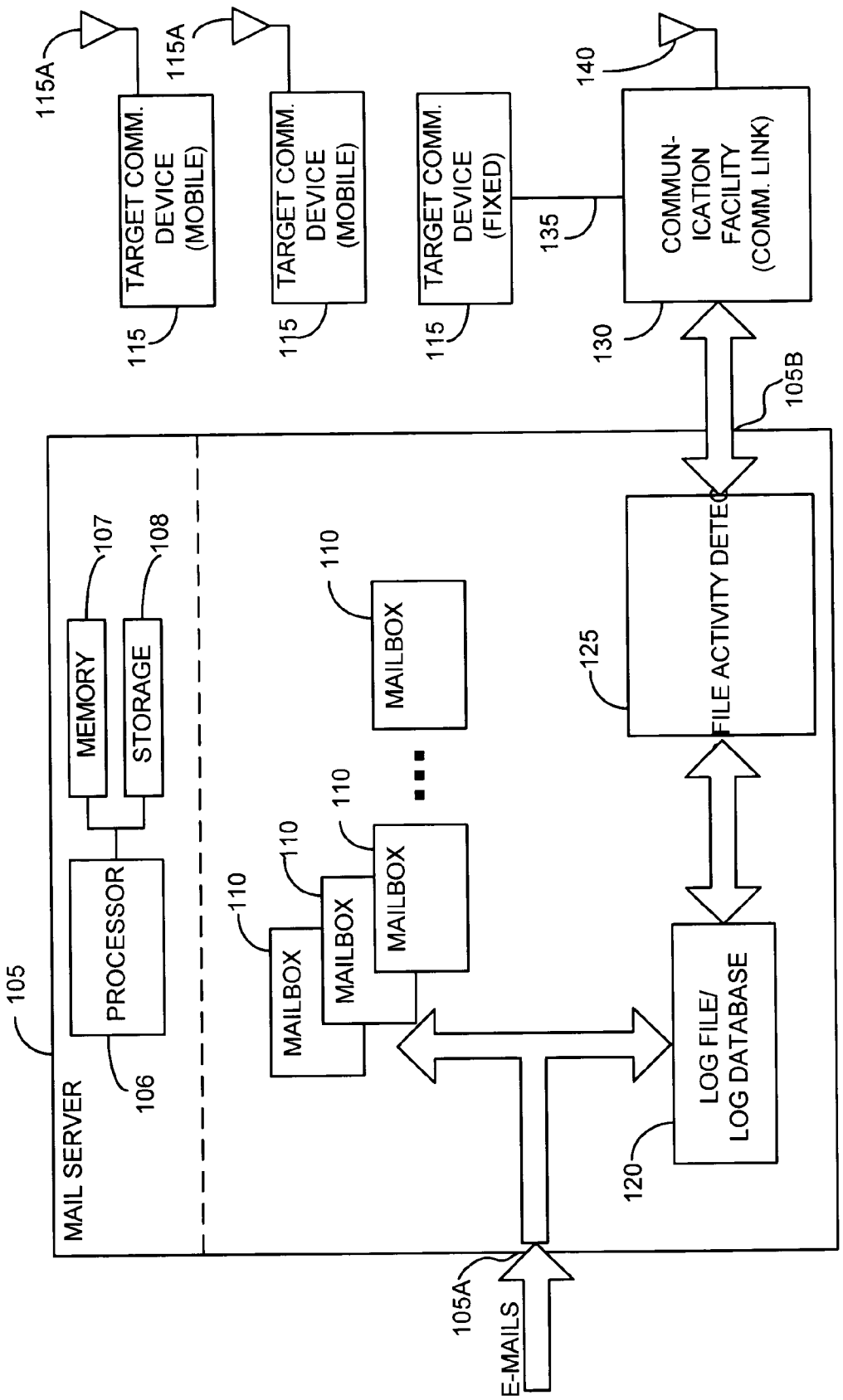
FIG. 1 is a block diagram of the disclosed message communication system.

FIG. 1 is a block diagram of the disclosed communication system 100 which includes a message server or mail server 105. A general purpose computer including a processor 106 coupled to a system memory 107 and a non-volatile mass storage 108 such as a hard disk drive is conveniently employed as mail server 105. Mail server 105 includes a plurality of message boxes or mailboxes 110. In actual practice, mailboxes 110 are located in storage 108 and/or memory 107. Each mailbox 110 corresponds to a different one of target communication devices 115, some of which are mobile wireless devices and others of which are fixed wire line-connected devices. Each of target communication devices 115 has a unique ID code that is associated therewith. The ID code functions as the address of device 115.

E-mail messages or other messages are provided to input 105A of mail server 105 as shown. Input 105A is connected to the Internet, an internal corporate email network, a private email network, or some other source of E-mail messages. If an E-mail message arrives which is addressed to a target communication device with an ID code of 123, then the email message is stored in a respective mailbox 110 which is associated with ID code 123. An entry is made in log file 120 indicating that the particular communication device 115 corresponding to ID code 123 has a message waiting in a respective mailbox 110 in mail server 105. Similarly, when an E-mail message arrives which is addressed to a target communication device with an ID code of 456, then the email message is stored in a respective mailbox 110 which is associated with ID code 456. An entry is now made in log file 120 indicating that the particular communications device 115 corresponding to ID code 456 has a message waiting in a respective mailbox 110 in mail server 105. Log file 120 is alternatively called the log database. Although drawn separately for clarity, mailboxes 110 and log file 120 are both situated in a mass storage 108 within mail server 105.

A message may be addressed to a single user or to a plurality of users. If the message is directed to a single user, then a single entry is made in log file 120 to indicate the time of arrival of the message. The message is placed in one mailbox, namely the mailbox 110 corresponding to the addressed user communication device. However, if a particular message is addressed to multiple users, then a respective entry is made in log file 120 for each user indicating the time of arrival of the message. Correspondingly, the message is placed in multiple mailboxes 110, namely the mailboxes 110 corresponding to each of the addressed user communication devices.

Mail server 105 includes a log file activity detector 125 which monitors log file 120 for new entries. Detector 125 is implemented as a software tool that obtains the latest log from log file 120 and determines which user communication devices have received an email in the last T minutes wherein T is a number that can be set by the user of a particular communication device or a system administrator. Typical values for T include 20 seconds through 24 hours although numbers less than or greater than this range can be used depending on the particular application. This testing is conducted either periodically or aperiodically as desired by the system administrator. Periodic testing of log file 120 by detector 125 is generally preferred. When detector 125 finds that a particular communication device 115 has a new log entry indicating that an email has been received since the last test of the log file, then a communication facility 130 connected to detector 125 notifies the particular communication device 115 that it has a message waiting in a respective mailbox 110. The user of the communication device 125 has the option of requesting a download of the new message in the user's mailbox. For example, the user can send a synchronization request back to mail server 105. This process of checking the log file 120 for new messages is repeated for all of the user communication devices on the system.

Advantageously, since the system does not automatically send out email content each time a new message is received by the mail server, the system is substantially less burdened as compared to systems which continuously resynchronize upon the arrival of new messages. Sending a new mail notice that an email has been received by the mail server is considerably less burdensome than sending actual email content which can at times be very lengthy and occupy substantial bandwidth.

Log file activity detector 125 is coupled at mail server output 105B to a communication facility 130 such as a communication link which transmits the new mail notice to the associated target communication device 115. Communication facility 130 can take many forms. Facility 130 can be a wireless service provider or a fixed wire line provider. The particular communication link 130 shown in FIG. 1 includes both a direct wire connection 135 to a target communication device without an antenna for wireless communication and a wireless connection via antenna 140 to those target communication devices 115 including antennas 115A as shown. Communication link 130 can employ software such as SureWave (SureWave is a trademark of JP Mobile Systems) to permit bi-directional synchronization of data between target communication devices 115 and mail server 105 in both real-time and off-line modes. Other vendor's systems such as Research In Motion's Blackberry (Blackberry is a trademark of RIM), for example, can be used to facilitate communication between mail server 105 and particular target communication devices 115.

Figure 2:
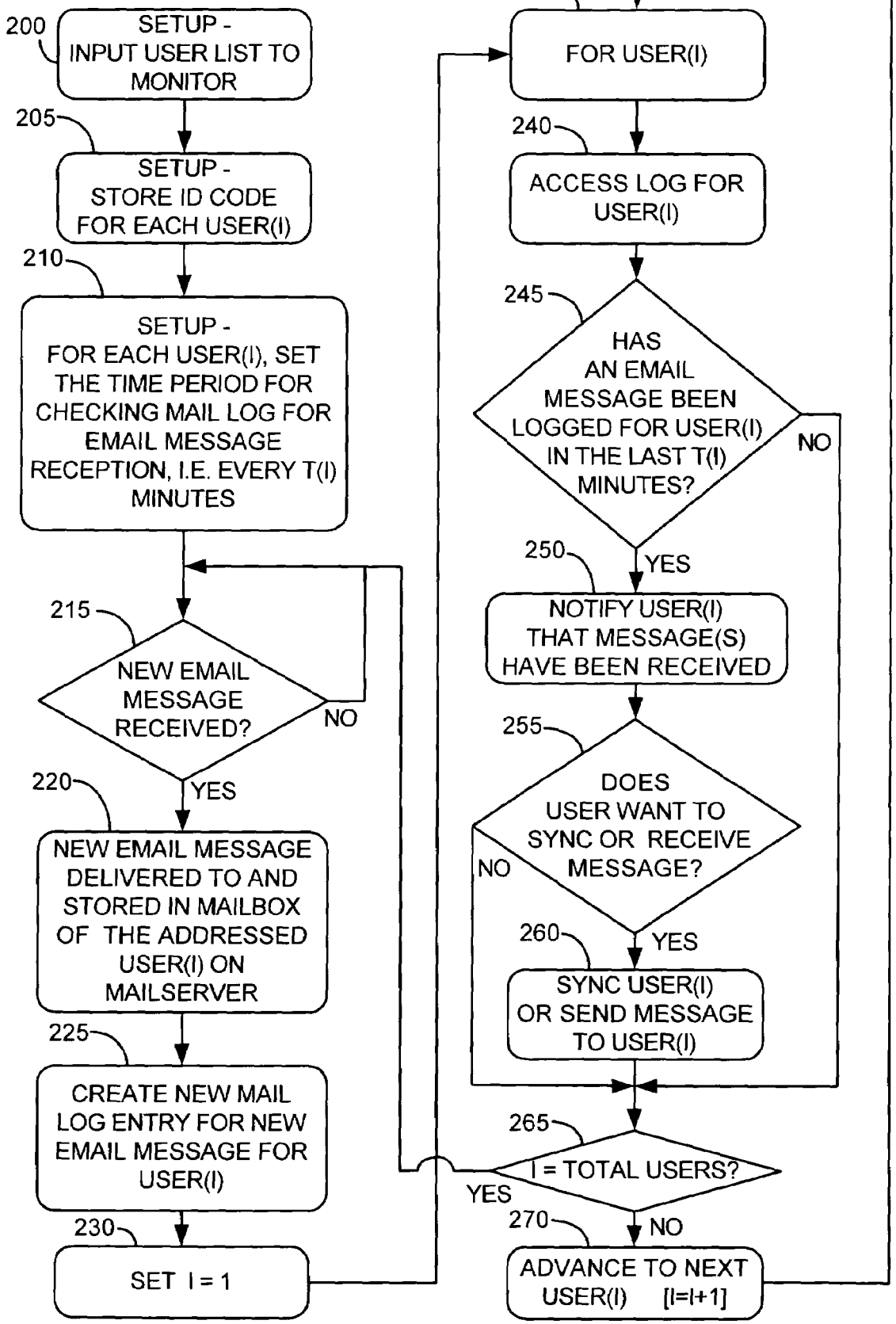
FIG. 2 is a flow chart of the detecting tool employed in the communication system to monitor the log file of the mail server for activity.

FIG. 2 is a flowchart which depicts the operation of the software program which is used to implement log file activity detector 125 in one embodiment of communication system 100. Initially the system is set up by inputting a user list which is stored in mass storage 108 as per block 200. The user list includes a list of the user's names and respective account numbers and ID codes. The user's ID code may also be referred to as the user's address. A unique ID code is assigned to each user of a target communication device 115 as per block 205. Thus, each communication device 115 has a unique ID code or address associated therewith. As per box 210, each user at his or her option can set a time period, T(I), which determines how frequently the system checks to see if that user has received an email message at that user's mailbox. I varies from 1, for USER(1) to the quantity "TOTAL USERS" which is the total number of users or communication devices on the system. If USER(1) sets the time period T(1) to 10 minutes, then the system will check to see if USER(1) has received an email message in that user's respective mailbox 110 within the last 10 minutes. If USER(2) sets the time period T(2) to 20 minutes, then the system will check to see if USER(2) has received an email message in that user's respective mailbox 110 within the last 20 minutes, as explained in more detail subsequently. The time period T(I) for each user is stored in the user list along with the user's name, account number and ID code. The operation of communication system 100 after the above setup is complete is now discussed. The system continuously monitors input 105A for incoming messages as per decision block 215. If no message is received then the system continues monitoring. However, when a message is received that message is delivered to and stored in the mailbox 110 of the USER(I) to which the particular message is addressed as per block 220. A mail log entry is then created as per block 225 to note the fact that a message intended for USER(I) has been received and stored in that user's mailbox. For example, if a message is received for USER(5), that user's mailbox stores the message and a log file entry is made including USER(5)'s ID code and the time and date at which the message was received. If a message is received for USER(6), that user's mailbox stores the message and a log file entry is made including USER(6)'s ID code and the time and date at which the message was received.

After a message is received, stored and the log file entry is created, the log file activity detector software 125 sets the counter I=1 as per block 230. At block 235 a loop is entered in which USER(1) through USER(TOTALUSERS) are checked to see if a log file entry has been made within the last T(I) minutes. The log file for USER(I) is entered at block 240. Since this is the first time that the loop is entered, I=1. Thus, the log entry for USER(1) is accessed. Assuming, for example, that the time period T(1) for USER(1) is 20 minutes, the system will check to see if a message for USER(1) has been received and logged within the last 20 minutes, If the answer is YES, then as per block 250, USER(1) is notified on that user's communication device 115(1) of the fact that a message has been delivered to the user's mailbox on mail server 105. USER(1) can then instruct communication device 115(1) as to whether or not the user desires to receive the message or synchronize communication device 115(1) with the user's mailbox. If USER(1) signals that message reception or synchronization is desired at decision block 255, then the message is sent to the USER(1) communication device 115(1) as per block 260. However, if message reception or synchronization is not requested by USER(1), then process flow continues to decision block 265 at which a decision is made as to whether or not all users have been processed, namely, whether I=TOTALUSERS. Since in this example, I=1 and USER(1) has just been processed, the total number of users has not been processed. Thus, the system advances to the next user, namely USER(2), by incrementing I=I+1 as per block 270. The user log entry for USER(2) is now entered and processed in a manner similar to that already described above with respect to USER(1) except that USER(2)'s entries in the log file are now checked to see if a message has been received within the last T(2) minutes.

Assuming that TOTALUSERS=2000, then the system will continue the loop described above with USER(3), USER(4) . . . until all 2000 users are processed by looking into their respective entries in log file 120 to determine if they received new email which was logged in within the last T(I) minutes. When I is found to be equal to TOTALUSERS at decision block 265 the loop ends and process flow reverts to decision block 215 at which the system again monitors for new email and the process starts over again.

Advantageously, the disclosed methodology and apparatus substantially reduce the burden placed on mail servers by communication devices which receive messages from mail servers.

Although illustrative embodiments have been shown and described, a wide range of modification, change and substitution is contemplated in the foregoing disclosure. For example, the messages processed by the disclosed system can be text mail or voice mail messages. Some features of an embodiment may be employed without a corresponding use of other features. Accordingly, it is appropriate that the appended claims be construed broadly and in manner consistent with the scope of the embodiments disclosed herein.

What is claimed is:

1. A method of processing messages comprising:
   receiving messages by a message server which includes a plurality of message boxes associated with respective user communication devices;
   logging, by the message server, the messages in a log file;
   checking, by the message server, the log file to detect if a message has been received by the message server for a particular user communication device within a predetermined time period;
   transmitting a notification to the particular user communication device if a message has been received by the message server for a particular user communication device; and
   receiving a signal at the message server from the particular user communication device to synchronize the contents of the particular user communication device with a message box at the message server corresponding to the communication device.

2. The method of claim 1 further comprising providing message detection information.

3. The method of claim 2 wherein the message detection information includes information indicating that a plurality of messages has been received that are addressed to a particular user.

4. The method of claim 2 wherein the message detection information includes information indicating that messages have been received that are addressed to a plurality of users.

5. The method of claim 1 further comprising transmitting the message to the particular user communication device upon receiving the signal.

6. The method of claim 1 further comprising receiving a signal at the message server from the particular user communication device indicating that the message is not to be transmitted to the particular user communication device.

7. The method of claim 1 wherein each communication device is associated with a unique identification code.

8. The method of claim 1 wherein the messages include E-mail messages.

9. The method of claim 1 wherein the message includes voice mail messages.

10. The method of claim 1 wherein the message server is a text mail server.

11. The method of claim 1 wherein the message server is a voice mail server.

12. The method of claim 1 including selecting, by a user, the predetermined time period.

13. The method of claim 1 including selecting, by a system administrator, the predetermined time period.

14. A communication system comprising:
    an input for receiving messages;
    a plurality of message boxes for storing messages, each message box being associated with a respective user communication device;
    a log file for logging times that respective messages are received for respective user communication devices;
    a log file activity detector for accessing the log file to detect if a message has been received by the communication system for a particular user communication device within a predetermined time period thus providing message detection information; and
    an output driven by the log file activity detector for notifying a particular user communication device with message detection information and to receive a signal from the particular user communication device indicating a request to synchronize the contents of the particular user communication device with a message box at the message server corresponding to the communication device.

15. The communication system of claim 14 including a communication link between the output and the user communication devices.

16. The communication system of claim 15 wherein the communication link is a wireless link.

17. The communication system of claim 15 wherein the communication link a wire link.

18. The communication system of claim 14 wherein the predetermined time period is selected by a user.

19. The communication system of claim 14 wherein the predetermined time period is selected by the a system administrator.

20. The communication system of claim 14 wherein each communication device is associated with a unique identification code.

21. The communication system of claim 14 wherein the messages include E-mail messages.

22. The communication system of claim 14 wherein the messages includes voice mail messages.

23. The communication system of claim 14 wherein the messages include text messages.

* * * * *